United States Patent [19]

Twardy et al.

[11] 4,211,072
[45] Jul. 8, 1980

[54] DEVICE FOR THE THERMAL DECOMPOSITION OF LIQUID FUELS

[75] Inventors: Harald Twardy, Müden/Örtze; Roger E. Lo, Möckmühl-Züttlingen, both of Fed. Rep. of Germany

[73] Assignee: Deutsche Forschungs- und Versuchsanstalt fur Luft- und Raumfahrt e.V., Cologne, Fed. Rep. of Germany

[21] Appl. No.: 875,927

[22] Filed: Feb. 7, 1978

[30] Foreign Application Priority Data

Feb. 17, 1977 [DE] Fed. Rep. of Germany ....... 2706679

[51] Int. Cl.² .............................................. F02K 9/02
[52] U.S. Cl. ................................. 60/203; 60/39.46 M
[58] Field of Search .............. 60/39.46 R, 39.46 M, 60/200 R, 203, 265, 300; 219/274, 381, 382

[56] References Cited

U.S. PATENT DOCUMENTS

| | | | |
|---|---|---|---|
| 2,507,464 | 5/1950 | de Andrade So | 219/274 X |
| 3,147,592 | 9/1964 | Rose | 60/39.46 M |
| 3,303,651 | 2/1967 | Grant et al. | 60/203 |
| 3,535,879 | 10/1970 | Kuntz | 60/200 R |
| 3,893,294 | 7/1975 | Bruun et al. | 60/200 R |
| 3,962,869 | 6/1976 | Wossner | 60/300 |
| 4,027,476 | 6/1977 | Schmidt | 60/300 |

*Primary Examiner*—Carlton R. Croyle
*Assistant Examiner*—Edward Look
*Attorney, Agent, or Firm*—Salter & Michaelson

[57] ABSTRACT

Device for the thermal decomposition of liquid fuel in which the fuel is introduced into a recess in a porous body of metallic foam material contained in a closed housing. The latter may be a combined reaction chamber and propulsive nozzle of a rocket propulsion unit or be used as a gas generator, for example, as a carburettor device leading to an internal combustion engine. The porous body of metallic foam material may be heated by an electrical heating coil wound around the housing.

7 Claims, 2 Drawing Figures

DEVICE FOR THE THERMAL DECOMPOSITION OF LIQUID FUELS

The invention concerns a device for the thermal decomposition of liquid fuels by passing the fuel into a porous body of metallic material which can be heated.

DESCRIPTION OF THE PRIOR ART

Devices of this type are known for the decomposition of hydrazine in rocket propulsion units with low thrust such as are, for example, installed for the stabilisation of the position of satellites. In this case layers of fine wire gauze are used for the porous filling body. Filling bodies of this type have a relatively coarse and non-uniform structure which leads to an unfavourable distribution of liquid on the heat-exchanging surfaces. For this reason there is also a tendency towards irregularity in the process of decomposition of the hydrazine.

In order to eliminate the difficulties which appear with gauze bodies it has also been proposed to use a porous body consisting of spherical packings in the form of a sintered body with sphere sizes of the order of magnitude of about 100 to 150$\mu$. Spherical packings of this type have a relatively low permeability cross-section and a low specific surface with relatively high specific weight. In addition, such spherical packings have the disadvantage of a relatively high pressure drop.

An object of the invention is to produce a device of the aforesaid type in which the disadvantage of known devices are eliminated.

SUMMARY OF THE INVENTION

This object is solved according to the invention in that the porous body consists of a metal foam. A metal foam with specific surface $>2500$ m$^2$/m$^3$ is preferably used.

The porous body is preferably formed into a bed in a closed housing with an inlet for the liquid fuel and an outlet for the propellant gas.

In a particularly convenient embodiment a recess is provided in the porous body in the neighbourhood of the input conduit for the liquid fuel. The recess conveniently comprises a shallow recess in an outer surface of the porous body communicating with a central elongate slot extending into the interior of the porous body.

The housing is preferably capable of being heated from the exterior in a known manner. It is convenient to provide an electrical heating device externally on the housing in a known manner.

When the device according to the invention is used for the production of a propellant gas for a stabilising propulsion unit for satellites the housing enclosing the porous body is conveniently the reaction space of the propulsion unit, while the outlet from the housing is in the form of a nozzle. The device may also be used as a gas generator, where gas produced by the decomposition is collected in a storage container. Compressed gas may be withdrawn from said container as required for expanding nozzles, control devices, or the like.

When the fuel to be decompressed is a liquid fuel which requires an auxiliary gas for its decomposition, the housing which encloses the porous body would be provided with another inlet in the neighbourhood of the feed conduit for the fuel, the necessary auxiliary gas being introduced through said additional inlet.

BRIEF DESCRIPTION OF THE DRAWINGS

Two devices for the thermal description of liquid fuel in accordance with the invention are illustrated in the accompanying drawings as examples and are described in detail in the following with reference to the drawings, in which:-

DESCRIPTION OF THE PREFERRED EMBODIMENTS

Figure 1:
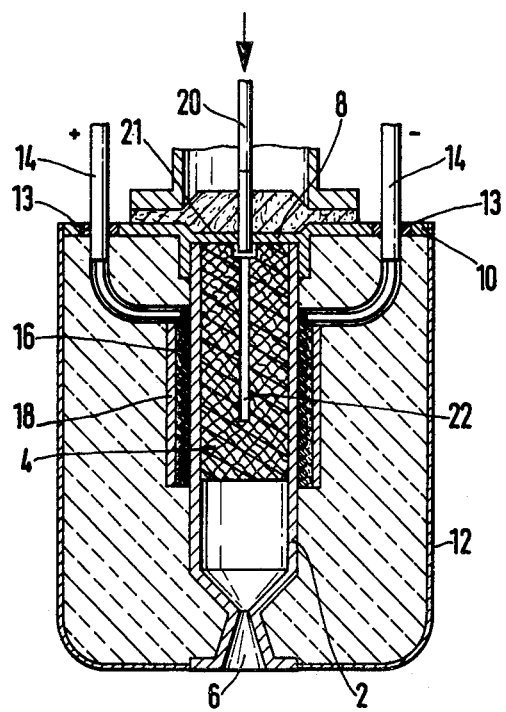
FIG. 1 is a schematic longitudinal section through a satellite propulsion unit incorporating a first device according to the invention.

FIG. 1 shows schematically the construction of a propulsion unit such as is used for the stabilisation of the position of satellites, where the pressure gas is produced by the thermal decomposition of hydrazine.

The propulsion unit illustrated includes a cylindrical reaction chamber 2 in which a porous body 4 is arranged. An expanding nozzle 6 is provided at the lower end (as shown) of the reaction chamber 2. At its upper end (as shown) the reaction chamber 2 is closed by a cover plate 8 which has a flange 10 which is mounted on a protective housing 12. In the flange 10 there are throughholes 13 for two electrical leads 14 which are connected to an electrical heating coil 16 which surrounds the external wall of the reaction chamber 2 in the region occupied by the porous body 4. The electrical heating coil 16 is covered externally by a cylindrical casing 18. The housing 12 is filled with an insulating material to keep the heat losses low. A tube 20 passes through the cover plate 8 and liquid fuel is led through the tube 20 into the reaction chamber 2.

The porous body 4 inside the reaction chamber 2 consists of a metal foam having a high specific surface, preferably a specific surface greater than 2500 m$^2$/m$^3$. Stated differently, commercially available metal foam exhibiting substantially uniform size pores mainly between 0.1 and 0.2 mm will produce such above-indicated desired specific surface of greater than 2500 m$^2$/m$^3$. When hydrazine is used as the fuel, the metal foam body may, for example, consist of nickel, chrome-nickel steel, platinum or a metal covered with platinum. The metal foam body 4 is inserted into the reaction chamber 2 with a pre-stress such that in the cold state a sufficient metal contact with the inner walls exists to guarantee good transfer of heat when the metal foam body is heated by means of the electrical heating coil 16 mounted externally on the reaction chamber 2. The metal foam body 4 has at its upper end (as shown) a recess 21 into which the lower end of the tube 20 dips. The recess 21 is extended by a recess 22 forming an axial prolongation of the tube 20 and extending through a considerable part of the axial length of the foam metal body 4. By means of the cavity 21 and the recess 22 a free surface is produced in the foam metal body which distributes the liquid hydrazine fed through the conduit 20 in such a way that wetting of the metal foam body takes place over a considerable part of its axial length. In this way accumulation of liquid hydrazine in a sump, or the like, is avoided. When the propulsion unit is to be brought into action, fuel is injected into the metal foam body 4, preheated by the electrical heating coil 16, for a period of time which may be in order of magnitude only a few milliseconds. This leads to a spontaneous decomposition of the hydrazine and, since the decomposition takes place exothermally, to a spontaneous heating of the metal foam body 4 which has only a very low density. This may, for example, be in the order of magnitude below 1 g/cm$^3$.

The decomposition of hydrazine is reproducible within very narrow limits so that it is possible to generate thrusts which are exactly reproducible in time and in order of magnitude. With the metal foam body 4 proposed according to the invention, optimal conversion in the reaction is ensured over a wide range of fuel through-put, while, because of the uniform distribution of fuel, no irregularities occur in the composition of hydrazine. An advantageous effect results from the fact that the body guarantees heat transfer to the liquid fuel over a large surface area.

Figure 2:
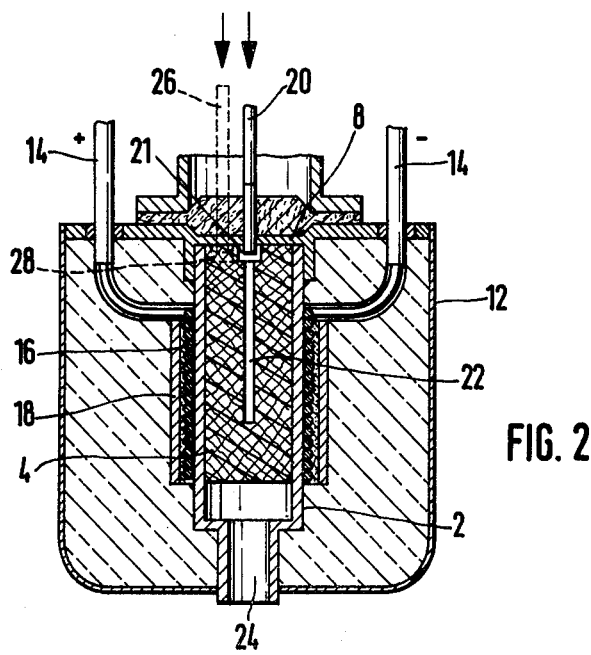
FIG. 2 is a schematic longitudinal section through a second device according to the invention, the device being used for the production of a gaseous decomposition product, for example for the production of a combustible gaseous mixture from methanol-containing fuels as a carburettor for internal combustion engines.

A device in accordance with the invention can also be used for the decomposition of liquid fuel in order to form combustible fuel gases. Insofar as a second component must be supplied for the decomposition of the fuel, in particular an oxidising agent, this is introduced into the porous body 4 simultaneously with the liquid fuel. A device for the production of a combustible fuel gas is illustrated in FIG. 2. This device is essentially similar to that of FIG. 1. Similar reference numbers are therefore used for similar elements. As a modification, the reaction chamber 2 is provided at the bottom (as shown) with a connecting tube 24. Parallel to the tube 20 by which the liquid fuel is introduced into the porous body 4 there is a second tube 26, of which the lower end (as shown) opens in a recess 28 at the upper end (as shown) of the metal foam body 4. The auxiliary component, which may be gaseous, is introduced through the tube 26. An intensive mixing of the two components introduced through the conduits 20 and 26 takes place in the metal foam body 4 and is accompanied by their simultaneous reaction. Once again a decomposition gas emerges from the metal foam body 4 and may be led to the consuming device through the tube 24.

A device according to FIG. 2 may, for example, be used for the gasification of methanol in motor vehicles, where air can be blown in through the tube 26 in a quantity sufficient to decompose the methanol.

Commercial metal foams may be used for the fabrication of the metal foam body 4, for example the metal foam manufactured by Dunlop Limited and known by the Trade Mark RETIMET.

What we claim as our invention and desire to secure by Letters Patent of the United States is:

1. A device for the non-catalytic thermal decomposition of liquid fuels comprising a substantially closed housing, a porous non-catalytic body of a regular geometric configuration having opposite axially separated end faces and composed of metallic foam material having a specific surface greater than 2500 m$^2$/m$^3$ disposed in said housing, an inlet for introducing such liquid fuel into said porous body passing through said housing and into said body, said body including a shallow recess disposed within one of said outer end surfaces of said body and in which said fuel inlet terminates, a centrally disposed elongated slot extending from said recess into the interior of said porous body, and an outlet, proximal the other of said end faces for directing the decomposition products from said body.

2. A device according to claim 1 including heating means by which the porous body can be heated from outside the housing.

3. A device according to claim 2, in which the heating means comprises an electrical heater mounted externally on the housing.

4. A device according to claim 1 in which the housing which encloses the porous body is a reaction space of a rocket propulsion unit and the outlet from the housing is a thrust nozzle.

5. A device according to claim 1 in which the housing includes an additional feed conduit leading into the porous body for the introduction thereto of an auxiliary gas for reaction within the porous body with the liquid fuel.

6. The device according to claim 1, said porous body including a generally uniform internal pore structure wherein the size of said pores is mainly between 0.1 and 0.2 mm.

7. The device according to claim 1 wherein said inlet is a tube, the end of said tube terminating within said recess maintained out of contact with said porous body to thermally insulate said tube from said body as when hydrazine or some other self-oxidized liquid fuel is utilized.

* * * * *